Patented Apr. 17, 1923.

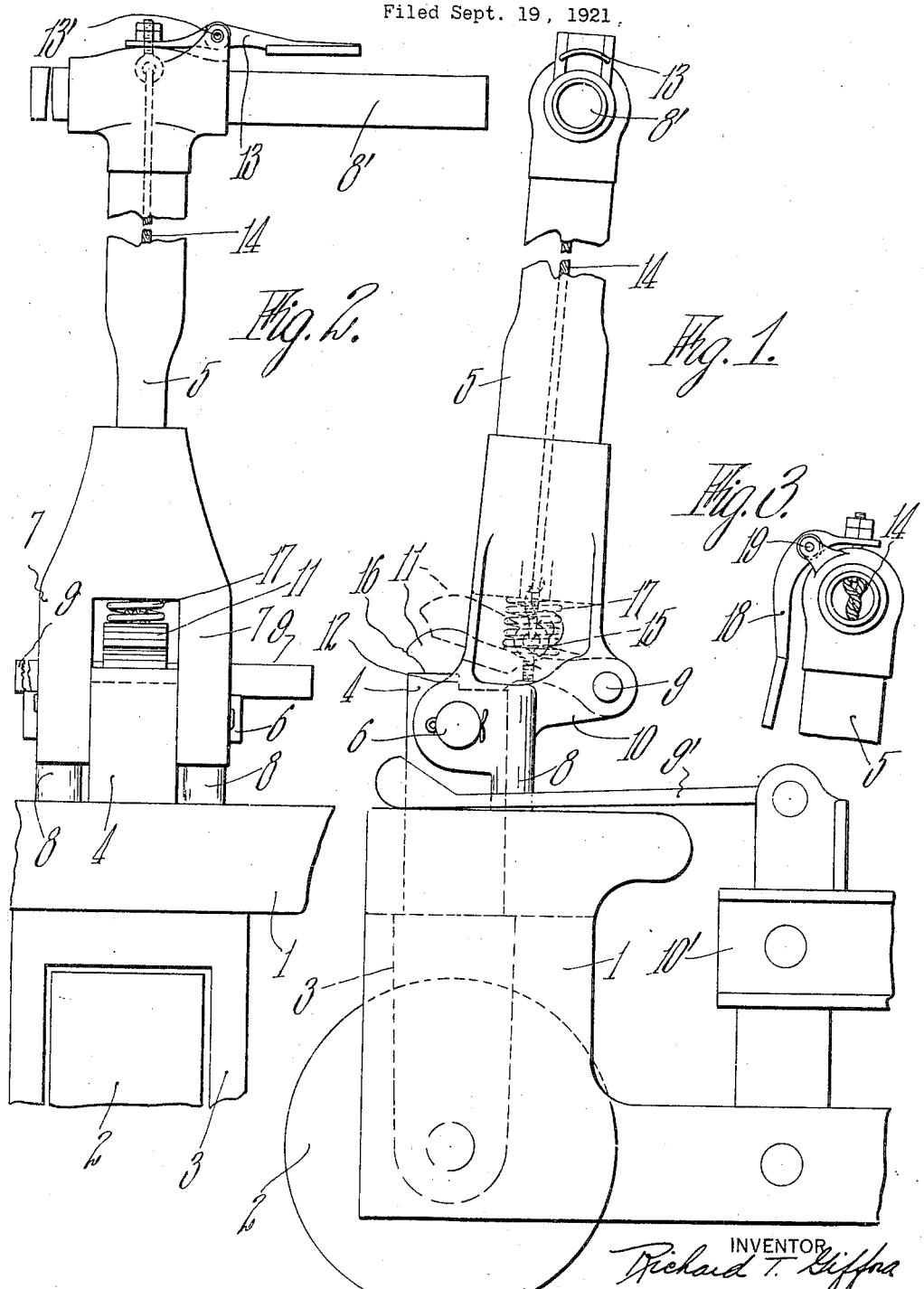

1,451,907

UNITED STATES PATENT OFFICE.

RICHARD T. GIFFORD, OF SPRINGFIELD, MASSACHUSETTS, ASSIGNOR TO EDWARD N. WHITE, J. LEWIS WYCKOFF, AND JAMES M. EATON, TRUSTEES, ALL OF HOLYOKE, MASSACHUSETTS.

HOLDING LATCH FOR TRUCK STEERING HANDLES.

Application filed September 19, 1921. Serial No. 501,626.

*To all whom it may concern:*

Be it known that I, RICHARD T. GIFFORD, citizen of the United States, residing at Springfield, in the county of Hampden and State of Massachusetts, have invented new and useful Improvements in Holding Latches for Truck Steering Handles, of which the following is a specification.

This invention relates to a holding latch for a steering handle of a truck, and more particularly to a truck in which the handle is pivotally mounted on the front wheel swiveled support of the truck.

Among the objects of the invention are to provide a simple device whereby the steering handle may be automatically locked in vertical position by a movement to that position and may be conveniently and quickly released by hand, when desired.

The use of this latch is very advantageous where trucks are to be moved about in a confined space as it holds the handle rigidly in vertical position but still allows the truck to be hauled or steered thereby. Another advantageous use is in the storing or shipping of trucks where by means of my device the trucks can be compactly placed without danger of the handles interfering with adjacent trucks. A still further advantageous use is found in the trailing of trucks, whereby the handles of the trailing trucks are prevented from interfering with the trucks immediately preceding.

My holding latch is particularly adapted for use in connection with an elevating truck of the general type disclosed in Patent No. 1,373,069, granted March 29, 1921, wherein the steering handle operates the elevating mechanism and is free for up-and-down movement when disengaged from the elevating mechanism.

Further objects and advantages of the invention will be apparent from the following description and accompanying drawing, which discloses a preferred embodiment of my invention and in which—

Fig. 1 is a side elevation of the device shown as applied to a truck of the type mentioned; and Fig. 2 is a front elevation of the same; and Fig. 3 is a fragmentary detail of a modified form of the releasing means.

Referring more particularly to the drawings, in which the front end of an elevating truck of the type above referred to is shown,—1 represents the front portion of the frame or frame head of the truck supported by the front steering wheel 2 which is carried in the support 3 swivelly mounted in the frame 1 and provided with a post 4. Upon the post 4 is pivotally mounted the steering handle 5 by means of a pin 6 passing through the lower forked end 7 of the handle 5 and the post 4. The steering handle 5 is provided with stop lugs 8, 8 at its forked end adapted to abut against the frame head to limit its pivotal movement in one direction beyond its vertical position and has the usual cross-bar 8' at its other end.

A cross-pin 9 is mounted in projections 10 of the forked end 7, 7 of the handle 5 and is adapted to be engaged with the hook member 9' of the platform 10' for elevating the same by the handle, in the manner well understood. Preferably, on the cross-pin 9, between the projections 10, 10, is pivotally mounted a latch 11 extending forwardly above the post 4 and between the forked end 7 of the handle 5. The post 4 is provided with a shoulder 12 against which the latch 11 is adapted to abut when the handle is in vertical position. The weight of the pivoted latch 11 may, in some cases, be sufficient to insure its automatic engagement behind the shoulder 12 whenever the handle 5 is swung to vertical position, although, as shown, the latch is preferably actuated by a spring 17, as hereinafter described. Since the handle 5 is limited in its backward movement beyond its vertical position by means of the stop lugs 8, 8, and since the latch 11 will hold the handle against movement in the forward direction, the handle 5 is thereby securely locked in a vertical position. It will be noted that the handle 5 is thus latched to the swiveled head or post of the steering wheel and is carried thereby in all turning movements. This enables the truck to be freely steered and hauled with the handle in its vertical position, which is a distinct advantage in manipulating the truck in confined areas.

In order to conveniently release the member 11 from engagement with the shoulder 12, means are provided preferably consisting of a hand lever 13 pivotally mounted at 13' adjacent to the cross-bar 8' of the handle 5, as shown in Figs. 1 and 2, and connected to the free end of latch 11 by a suitable connection. In the modification shown in Fig. 3, a hand lever 18 is pivoted at 19 so as to extend along the shank portion of the handle 5 and is connected to the cable 14, as shown, for lifting the latch 11. In the present embodiment of the invention this connection consists of a cable or chain rod 14 secured to the lever 13, extending through the handle 5 and fastened to the free end of the member 11 by any suitable means, as by an eye 15 tapped into the free end of the member 11.

A spring 17 is preferably provided between the latch 11 and the handle 5 to insure the automatic engagement of the latch 11 behind the shoulder 12 whenever the handle 5 is swung to vertical position and is preferably of spiral form surrounding the eye 15 and the connection of the cable 14 thereto. The spring 17 is held in place by reason of its location, its lower end engaging the upper surface of the latch 11 and its upper end bearing against the surface formed between the forked end 7 of the handle 5, thereby tending to force the latch 11 downwardly against the post 4.

The latch 11 is also provided with a forward extension 16 projecting beyond the space between the post 4 and the forked ends 7 of the handle which is adapted to be kicked by the operator's foot to lift the latch for a release thereof.

With the handle in vertical position, the latch is in engagement with the shoulder on the post 4 and the handle is held in this position until the latch is released by pressure on the hand lever or by an upward thrust on the projection on the part of the operator. When the latch is thus released and the handle swung slightly in its forward direction, the latch will ride upon the shoulder but in no way interfere with the free up-and-down movement of the handle. As soon as the handle is swung back to vertical position, the latch, by reason of the spring 17, will engage the shoulder and automatically latch the handle in vertical position.

It will be observed that a simple device has been constructed to hold the steering handle of a truck in a vertical position which is automatically operable when the handle is swung to that position, and simple and convenient means have been provided to release the handle.

While the present embodiment of the invention is shown to be especially adaptable to an elevating truck of a type as disclosed in the patent referred to above, it will be apparent that various changes may be made from the construction shown herein to adapt the device to different types of trucks and that these changes may be made without departing from the spirit of the invention, the scope of which is defined in the appended claims.

What I claim is:

1. In a truck in combination, a front wheel swiveled support, a steering handle pivoted to said support for up-and-down movement, a stop for limiting in one direction the movement of said handle beyond its vertical position, a latch and coacting member one located on said handle and one located on said swivelled support for holding said handle against movement beyond its vertical position in the other direction.

2. In a truck in combination, a front wheel swiveled support, a steering handle pivoted to said support for up-and-down movement, a stop for limiting in one direction the movement of said handle beyond its vertical position and a latch and coacting member one located on said handle and one located on said swiveled support, automatically operable when said handle is swung to vertical position to hold said handle against movement beyond its vertical position in the other direction.

3. In a truck in combination, a front wheel swiveled support, a steering handle pivoted to said support for up-and-down movement, a stop for limiting in one direction the movement of said handle beyond its vertical position, a latch between said handle and said swiveled support and movably mounted adjacent the lower end of said handle, automatically operable when said handle is swung to vertical position to hold said handle against movement beyond its vertical position in the other direction, and means operated manually from the other end of said handle to release said latch and free said handle.

4. In a truck in combination, a front wheel swiveled support having a shoulder, a steering handle pivoted to said support for up-and-down movement, a stop for limiting in one direction the movement of said handle beyond its vertical position, a latch movably mounted on said handle and adapted to engage said shoulder on said swiveled support when said handle is swung to vertical position to hold said handle against movement beyond its vertical position in the other direction.

5. In a truck in combination, a front wheel swiveled support having a shoulder, a steering handle pivoted to said support for up-and-down movement, a stop for limiting in one direction the movement of said handle beyond its vertical position, a latch movably mounted on said handle adjacent the lower end thereof and adapted to engage said shoulder on said swiveled support when said handle is swung to vertical position to hold said handle against movement beyond its vertical position in the other direction, a manually-operated lever adjacent the other end of said handle, and a connection between said lever and said latch whereby the latter may be manually released from its engagement with said shoulder.

6. In a truck in combination, a front wheel swiveled support having a shoulder, a steering handle having a forked lower end pivoted to said support for up-and-down movement, a stop for limiting in one direction the movement of said handle beyond its vertical position, and a latch pivotally mounted within the forked lower end of said handle and adapted to engage said shoulder on said swiveled support when said handle is swung to vertical position to hold said handle against movement beyond its vertical position in the other direction.

7. In a truck in combination, a front wheel swiveled support having a shoulder, a steering handle having a forked lower end pivoted to said support for up-and-down movement, a stop for limiting in one direction the movement of said handle beyond its vertical position, and a spring-operated latch pivotally mounted within the forked lower end of said handle and adapted to engage said shoulder on said swiveled support when said handle is swung to vertical position to hold said handle against movement beyond its vertical position in the other direction, said latch having a forward extension adapted to be engaged by the foot of the operator for releasing said latch.

In testimony whereof I have affixed my signature.

RICHARD T. GIFFORD.